United States Patent
Lenhart, Jr.

(10) Patent No.: US 12,553,118 B2
(45) Date of Patent: Feb. 17, 2026

(54) VARIABLE DIFFUSION CARBURIZING METHOD

(71) Applicant: GKN Sinter Metals, LLC, Auburn Hills, MI (US)

(72) Inventor: David E. Lenhart, Jr., Pomeroy, OH (US)

(73) Assignee: GKN Sinter Metals, LLC, Auburn Hills, MI (US)

( * ) Notice: Subject to any disclaimer, the term of this patent is extended or adjusted under 35 U.S.C. 154(b) by 256 days.

(21) Appl. No.: 17/602,605

(22) PCT Filed: Mar. 26, 2020

(86) PCT No.: PCT/US2020/025005
§ 371 (c)(1),
(2) Date: Oct. 8, 2021

(87) PCT Pub. No.: WO2020/210045
PCT Pub. Date: Oct. 15, 2020

(65) Prior Publication Data
US 2022/0213584 A1    Jul. 7, 2022

Related U.S. Application Data (60) Provisional application No. 62/833,407, filed on Apr. 12, 2019.

(51) Int. Cl.
*C23C 8/22* (2006.01)
*B22F 3/10* (2006.01)
(Continued)

(52) U.S. Cl.
CPC .............. *C23C 8/22* (2013.01); *B22F 3/1007* (2013.01); *B22F 3/17* (2013.01); *B22F 5/08* (2013.01);
(Continued)

(58) Field of Classification Search
CPC ...... C23C 8/20; B22F 3/17; B22F 3/24; B22F 3/1007; B22F 2003/248; B22F 2201/30; B22F 3/1028
(Continued)

(56) References Cited

U.S. PATENT DOCUMENTS 3,992,763 A * 11/1976 Haynie ................. B22F 3/1007
419/57
4,165,243 A * 8/1979 Sarnes .................... C22C 33/02
148/213
(Continued)

FOREIGN PATENT DOCUMENTS

CA    1052668    4/1979
GB    1540848    2/1979
(Continued)

OTHER PUBLICATIONS

PCT International Search Report and Written Opinion, PCT/US2020/025005, Jun. 8, 2020, 14 pages.
(Continued)

*Primary Examiner* — Ricardo D Morales
(74) *Attorney, Agent, or Firm* — Quarles & Brady LLP (57) ABSTRACT

A method of carburizing a powder metal part involving more than one carburizing step. In a pre-forging carburizing step, a powder metal part that is less than fully dense is carburized to establish a pre-forging carburization profile. After the pre-forging carburizing step, the powder metal part is forged so that the powder metal part is increased in density and the pre-forging carburization profile is transformed into an as-forged carburization profile. In a post-forging carburizing step following the forging step, the powder metal part is again carburized, thereby resulting in both further diffusion of carbon from the as-forged carburization profile into the
(Continued)

powder metal part and further introduction of carbon into the powder metal part at a surface of the powder metal part.

16 Claims, 6 Drawing Sheets

(51) Int. Cl.
  *B22F 3/17* (2006.01)
  *B22F 3/24* (2006.01)
  *B22F 5/08* (2006.01)

(52) U.S. Cl.
  CPC ... *B22F 2003/247* (2013.01); *B22F 2003/248* (2013.01); *B22F 2201/30* (2013.01); *B22F 2207/01* (2013.01); *B22F 2998/10* (2013.01)

(58) Field of Classification Search
  USPC .................. 148/206, 207; 419/26, 28, 29
  See application file for complete search history.

(56) References Cited

U.S. PATENT DOCUMENTS

| | | |
|---|---|---|
| 5,718,774 A | 2/1998 | Tukamoto et al. |
| 8,517,884 B2 | 8/2013 | Geiman et al. |
| 10,213,832 B2 | 2/2019 | Hagimoto et al. |
| 2002/0155018 A1* | 10/2002 | Lund ............... C22C 38/22 420/105 |
| 2006/0266436 A1 | 11/2006 | Fett |
| 2007/0221005 A1 | 9/2007 | Geiman |
| 2007/0221006 A1 | 9/2007 | Geiman |

FOREIGN PATENT DOCUMENTS

| | | |
|---|---|---|
| JP | H0523777 A | 2/1993 |
| JP | H0938747 A | 2/1997 |
| JP | 2002102994 A | 4/2002 |
| JP | 2002113544 A | 4/2002 |
| JP | 2006342426 A | 12/2006 |
| JP | 2013204080 A | 10/2013 |
| WO | 2009025661 A1 | 2/2009 |

OTHER PUBLICATIONS

Japan Patent Office, Notification of Reasons for Refusal, Application No. 2021-559997, Apr. 11, 2023, 8 pages.
Japan Patent Office, Notification of Reasons for Refusal, Application No. 2021-559997, Jun. 13, 2023, 5 pages.

* cited by examiner (A)

Case profile of pinion wrought part 10X (B)

Case profile of pinion powder metal part 10X

Case Profile Powder Metal Part 10X

Forging with carbon layer shown (B)

Forging with final carburizing shown

VARIABLE DIFFUSION CARBURIZING METHOD

CROSS-REFERENCE TO RELATED APPLICATION

This application represents the U.S. national stage entry of International Application No. PCT/US2020/025005 filed Mar. 26, 2020, which claims the benefit of the filing date of U.S. Provisional Patent Application No. 62/833,407 entitled "Variable Diffusion Carburizing Method" filed on Apr. 12, 2019, which is hereby incorporated by reference for all purposes as if set forth in its entirety herein.

STATEMENT OF FEDERALLY SPONSORED RESEARCH OR DEVELOPMENT

Not applicable.

FIELD OF THE INVENTION

This disclosure relates to methods of carburizing powder metal components.

BACKGROUND

Many highly stressed ferrous components are engineered to have high strength near their surfaces with a ductile core area with higher toughness. For example, many conventional gears utilize such a design in their teeth to provide tooth surfaces that are strong with cores that are comparably ductile to provide the right balance of mechanical material properties based on the function of the teeth.

A common way to achieve such a difference in the material properties between the surface of a ferrous component and its core is by carburizing the component. During typical carburization, the component is heated in the presence of a carbon-bearing material and carbon is introduced to and absorbed at the surface of the component. This carbon then diffuses inward into the volume of the body of the component. Typically, the component is heated in a carefully controlled carbon-containing gas environment, although historically the component might have been packed in contact with a carbon-rich material such as charcoal to provide the carbon.

A component that has been carburized is then often quenched to form a martensitic phase in the component. The creation of martensite increases strength and hardness in the surface layer, but martensite is also very brittle. Further heat treating, such as tempering, may be used to mitigate some of the brittleness in the component.

Being a diffusion-based process, such case carburizing is dependent on both time and temperature and this dependency can have microstructural, macrostructural, and economic implications. For example, due to the slow diffusion rate of steel, often a distinct and relatively sharp transition in carbon content (and therefore materials properties) occurs between the high carbon-containing surface layer and the original parent material which may not include much, if any, carbon. This means that, while the distinct carburized layer can help support applied loads, it quickly transitions into a ductile core which does little to support the high loads with the carburized layer (although the core can provide the aforementioned toughness and ductility). Still further, with both time and temperature as process variables, carburizing can potentially be very expensive requiring both significant energy and equipment throughput. The cost of such inputs are taken into consideration along with the desired resultant profile (for example, depth, carbon content and so forth) when selecting process parameters for the carburization of a particular line of components.

SUMMARY

Disclosed herein are improved methods of carburizing powder metal parts. These methods of carburizing involve sequentially processing a powder metal part by carburizing the powder metal part at less than full density (in some cases, as part of a sinter-carburizing process), then forging the part to increase the density of the powder metal part, and then again carburizing the powder metal part after forging. The pre-forging carburization step can help the carbon to penetrate initially to greater depths than in a fully dense wrought part under similar time-temperature-atmosphere conditions by exploiting the ability of the carbon-containing gases to transport carbon via the porous network of the powder metal part early in the process before the pores have been closed by sintering and/or by forging. This can effectively "dope" an initial carbon profile relatively deeply to what will become the outer surface of the part after the forging step, without solely relying on solid-state diffusion as the transport mechanism as would necessarily be the case in a fully dense part. After forging, the forged part can again be carburized at elevated temperature; however, with some locked-in carbon already being pre-established at depths from the outer surface of the forged powder metal part, this initially introduced carbon can now further diffuse into the part during heating while new carbon is introduced at the surface of the part which can create a greater carbon content at that surface. This multistep process can create both a more complex and gradual carbon gradient that can be widely varied and engineered to have a desired case profile by variation of different process parameters.

In addition to providing a less sharp transition between the hardened case and the core, the forging step may also notably be engineered to shape the initially locked-in carbon profile. For example, by creating variable flow of the material of the part during the forging step—which may be achieved by designing the pre-forged preform to have dimensions that are not proportional to the post-forged form—sections of the initial carbon profile may be thickened and/or thinned or stretched and/or compressed to create a varying thickness of the initial carbon layer before the subsequent carburizing step. In this way, rather sophisticated tailored carburization profiles may be generated.

These improved methods of carburizing may offer many benefits over the current state of the art. As one example, this sequence permits the development of a variable case depth in the resultant part using conventional case carburizing processes (that is, sinter-carburizing and gas carburizing on a full or near full density part), but with reduced time and cost savings in comparison to carburization of a fully-dense wrought part. Still further, this sequence permits the development of a variable case depth and geometry that cannot be produced using existing sinter-carburizing technology alone.

According to one aspect, a method of carburizing a powder metal part is provided. In a pre-forging carburizing step, a powder metal part that is less than fully dense is carburized to establish a pre-forging carburization profile. Then, the powder metal part is forged after the pre-forging carburizing step so that the powder metal part is increased in density. This forging also transforms the pre-forging carburization profile into an as-forged carburization profile. In a post-forging carburizing step, the powder metal part is carburized after the forging step. This post-forging carburizing step results in both further diffusion of carbon from the as-forged carburization profile into the powder metal part and further introduction of carbon (from the carburizing environment) into the powder metal part at a surface of the powder metal part.

In some forms of the method, during the step of forging, the powder metal part may be forged to effective full density for the powder metal part. Those having skill in the art will appreciate that effective full density for a powder metal part, even after forging, is less than theoretical full density and involves elimination of nearly all internal porosity. In the context of a ferrous component, it is contemplated that effective full density may be, for example, at or above 98% of theoretical full density. However, such effective full densities may also be established by reference to Metal Powder Industries Federation (MPIF) standards for a given material. Theoretical full density in the context of this application refers to the true density of a material corresponding to a full density without any pores or porosity.

In some forms, a density of the powder metal part that is less than fully dense before the forging step may be less than 95% of theoretical full density. Again, this percentage is by way of example only and the specific percentage can be dependent on sinterability of a particular material composition, but it will in any event be understood that the powder metal component being subjected to the first pre-forging carburization step is less than full dense and, at least in some forms, has a network of connected pores to enable non-solid state or gaseous migration of carbon to occur within the powder metal part, such that carburization depth is not merely primarily function of time and temperature as it would be in a fully dense part.

In some forms of the method, the method may further comprise sintering the powder metal part. In cases where the method includes sintering, it is contemplated that the pre-forging carburizing step may occur during the sintering of the powder metal part (that is, simultaneously or contemporaneously therewith as in the sinter-carburizing process). In this way, it is contemplated that the powder metal part, at that time in form of a green compact, may have a relatively low density relative to theoretical full density and, when any binder or lubricant holding the powder metal particles is burned off, the remaining porous network of the green compact might be utilized at least temporarily for gaseous transport of carbon from the atmosphere into the compact. For example, the density of the powder metal part prior to sintering may be, for example, less than 90% of theoretical full density of the powder metal component.

In some forms, a base carbon percentage of the powder metal part may be 0.1 to 0.3 weight percent of the powder metal part prior to the pre-forging carburizing step. By "base carbon percentage", it is mean the amount of carbon in the material prior to any carburizing heat treatments during processing of the powder metal in a compact or sintered form. With such a starting base carbon percentage, a percent of carbon in a carburized region of the pre-forging carburization profile may be, for example, 0.5 to 0.6 weight percent carbon after the pre-forging carburizing step. After the forging and post-forging carburizing steps, a carbon percentage in a region closest to the surface of the powder metal part may be 0.7 to 0.9 weight percent carbon.

In some forms of the method, the transforming of the pre-forging carburization profile into an as-forged carburization profile may involve starting from a pre-forging carburization profile having a uniform depth relative to the surface of the powder metal part and then forging the powder metal part such that the as-forged carburization profile has a varying depth relative to the surface of the powder metal part after forging. Put differently, the forging may result in a geometric change in the profile during the forging process due to variable flow of material. This may be specifically engineered into the process and is described in, for example, U.S. Pat. No. 8,517,884 entitled "Powder Forged Differential Gear" which issued on Aug. 27, 2013 to GKN Sinter Metals, LLC and which is incorporated by reference as if set for in its entity herein for all purposes.

In some forms, the powder metal part may be ferrous and, practically speaking, such carburization will be made on iron-based powder metal particles.

In some forms of the method, the pre-forging carburizing step may result in carburization to a greater depth than a comparable powder metal part of similar composition that is fully dense under similar time-temperature-atmospheric exposure conditions for carburizing. This greater depth of carburization results because the porosity of the powder metal part prior to the forging step provides non-solid-state diffusion based pathways for deeper penetration of carbon into a volume of the powder metal part in comparison to a fully dense part.

In some forms, the powder metal part made by the method may be a gear. In the case of a differential gear, particularly small differential gears may have features that are unable to be processed using traditional sinter-carburizing techniques due to the inability to forge, for example, in an inner diameter pin hole or spline when the surface has been significantly case hardened prior to forging. In hypoid ring gears, there may be an inability to maintain root depth hardness due to material flow. In a parallel axis gear of small tooth module, the carburization layer may be too deep for the tooth thickness.

In some forms, after the post-forging carburization step, the powder metal part may have a final carburization profile. The final carburization profile may have a carbon gradient from the surface of the powder metal part into the volume than is more gradual than a gradient from carburization of a full dense part that is carburized as a single step under similar time-temperature-atmospheric exposure conditions.

In some forms, the method may further include machining (for example, soft turning) the powder metal part between the forging step and the post-forging carburizing step. At this point, while some carbon has been added, not all carbon has been added, but the part is at final or near final geometry and it may be easier to forge the powder metal part at this stage than after the post-forging carburization step.

Still yet, a powder metal part produced from the various methods described herein is also contemplated as falling within the scope of this disclosure.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION

To best understand the disclosed methods and their improvements over the state of the art, a brief comparison of traditional gas carburization and traditional sinter-carburization will now be provided. With an understanding of those modes of carburization, it can then be understood how the new method involves aspects of both of modes (which can be slightly modified) with an intermediate forging step to arrive at unique carburization profiles in powder metal components that can be made at reduced cost.

In conventional gas carburization, a fully dense ferrous product is placed in a heated environment including a carbon-containing gas for some duration of time under conditions that result in the absorption of carbon from the environment into the ferrous product. Increases in heat result in shorter cycles, more carbon penetration depth per length of time, but can come at the expense of certain other unwanted metallurgical or dimensional outcomes (such as grain growth or sagging or warping of the part). Traditional gas carburizing methods are therefore constrained by the amount of heat (that is, the temperature) of the operation and the diffusion curve of the material at that temperature. Based on the material being gas carburized, the final result is therefore largely a function of that diffusion curve and time at temperature.

In fully dense wrought materials, the carburized surface profile is typically depicted as a very high carbon zone over a very low carbon zone with a narrow transition area. Due to the method of the process, the carburized zone of the part is typically of very uniform thickness all over the exposed surfaces.

Figure 1:
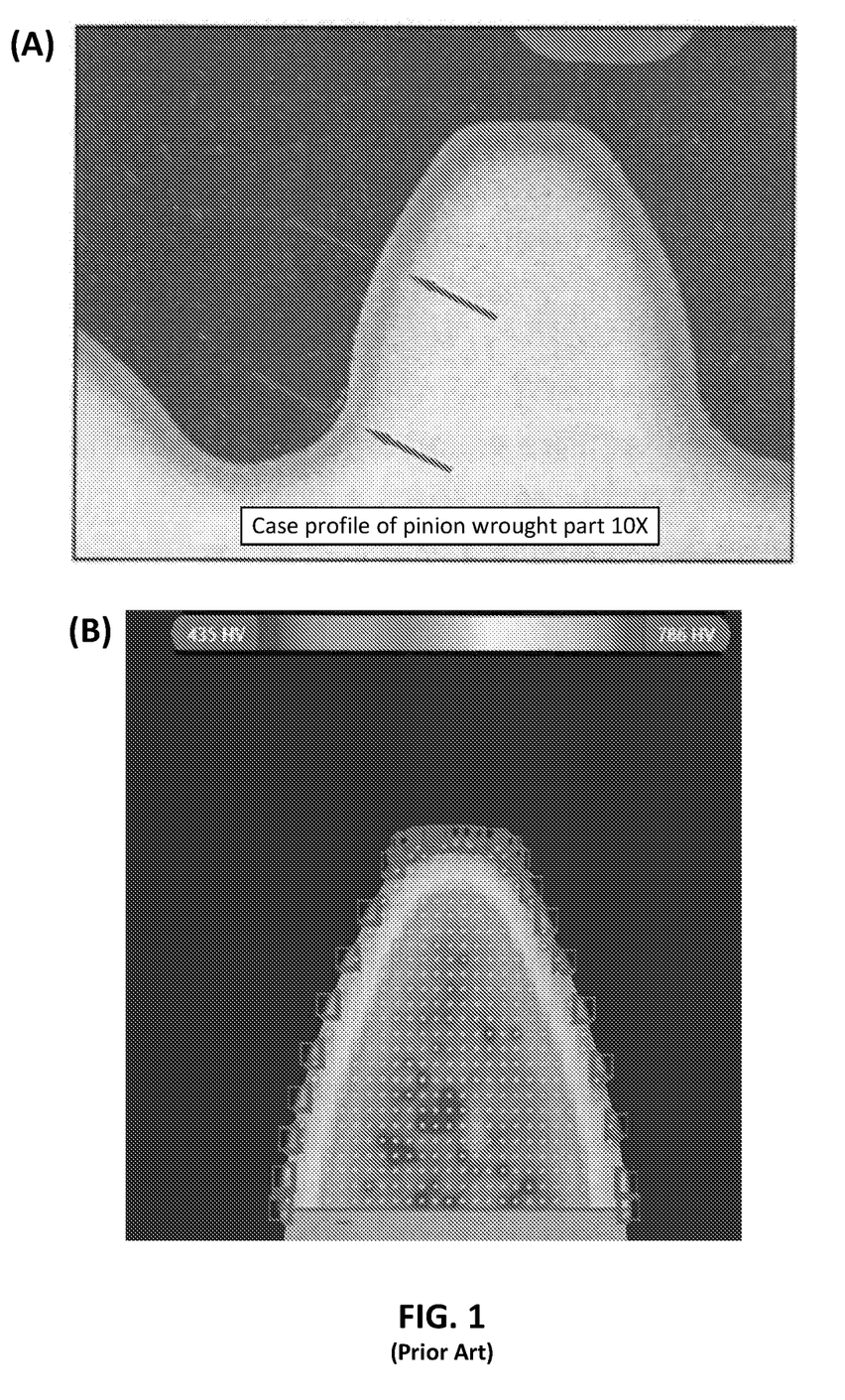
FIGS. 1A and 1B provide images of a case profile of a wrought part produced using conventional gas carburizing methods alone.

FIGS. 1A and 1B depicts such uniformity of the profile in two images of a gear tooth that is wrought and that has been gas carburized, in which the case profile is of very uniform thickness over the surface of the tooth. FIG. 1A is a micrograph illustrating the case depth with arrows being used to express the uniform case depth at various locations over the surface of the tooth. FIG. 1B illustrates the Vickers hardness numbers of the tooth at various locations and it can be seen that the tooth has an outer surface layer with high hardness numbers (up to 786 HV) while the core is appreciably less (only 435-500 HV). The transition between the outer layer or hardened case and the core is rather dramatic and sharp.

The majority of carburizing of ferrous components commercially is based on gas carburization of wrought or fully dense parts. This is, in large part, because many components are fully dense based on their mode of manufacture prior to carburizing such as casting, extruding, and so forth.

Notably, however, another less-common method exists for carburizing types of powder metal components exists called sinter-carburizing or "sinta carb", which can be used to develop deeper carbon profiles.

To understand how sinter-carburizing works, one must first understand how powder metal components are made in a general sense. In the production of powder metal components, a powder metal powder along with a binder, wax, and/or lubricant are compressed together to form a green compact having a geometry which closely resembles the final desired product. This green compact is then sintered in a furnace at temperature typically approaching, but slightly less than, the melting temperature of the powder metal. Although there are some sintering processes in which a limited amount of the green compact becomes a liquid phase (known as liquid-phase sintering), many sintering processes are based solely on solid-state diffusion with the binder, wax, and/or lubricant typically burning off while the powder metal particles neck into one another to form a unified sintered body. During the sintering process, the space between particles can provide a network of pores, although such pores reduce in size and close up as sintering continues. However, even as-sintered, some amount of porosity may remain in the sintered body.

The sinter-carburizing process exploits the existence of this porous network to introduce carbon during the sintering production step with the part already being at elevated temperature. As there is a porous network between the powder metal particles at least at the start of the sintering step, it is possible for carbon-containing gases to flow into these pores to provide gaseous transport of the carbon-containing gases deeper into the body of the part to at least some depth beyond what will eventually form the outer surface of the part after sintering, so that the carbon may be absorbed at those greater depths. As gaseous transport through the porous network is based primarily of the flow of gas and not solid state-diffusion, it is possible to quickly obtain a greater carburizing depth and a more gradual gradient using this sinter-carburizing technique than in the gas carburization of a fully dense part. Thus, sinter-carburizing can be used to efficiently carburize less dense powder metal components with improved diffusion depth, often prior to a final, fully densifying forging process.

Figure 2:
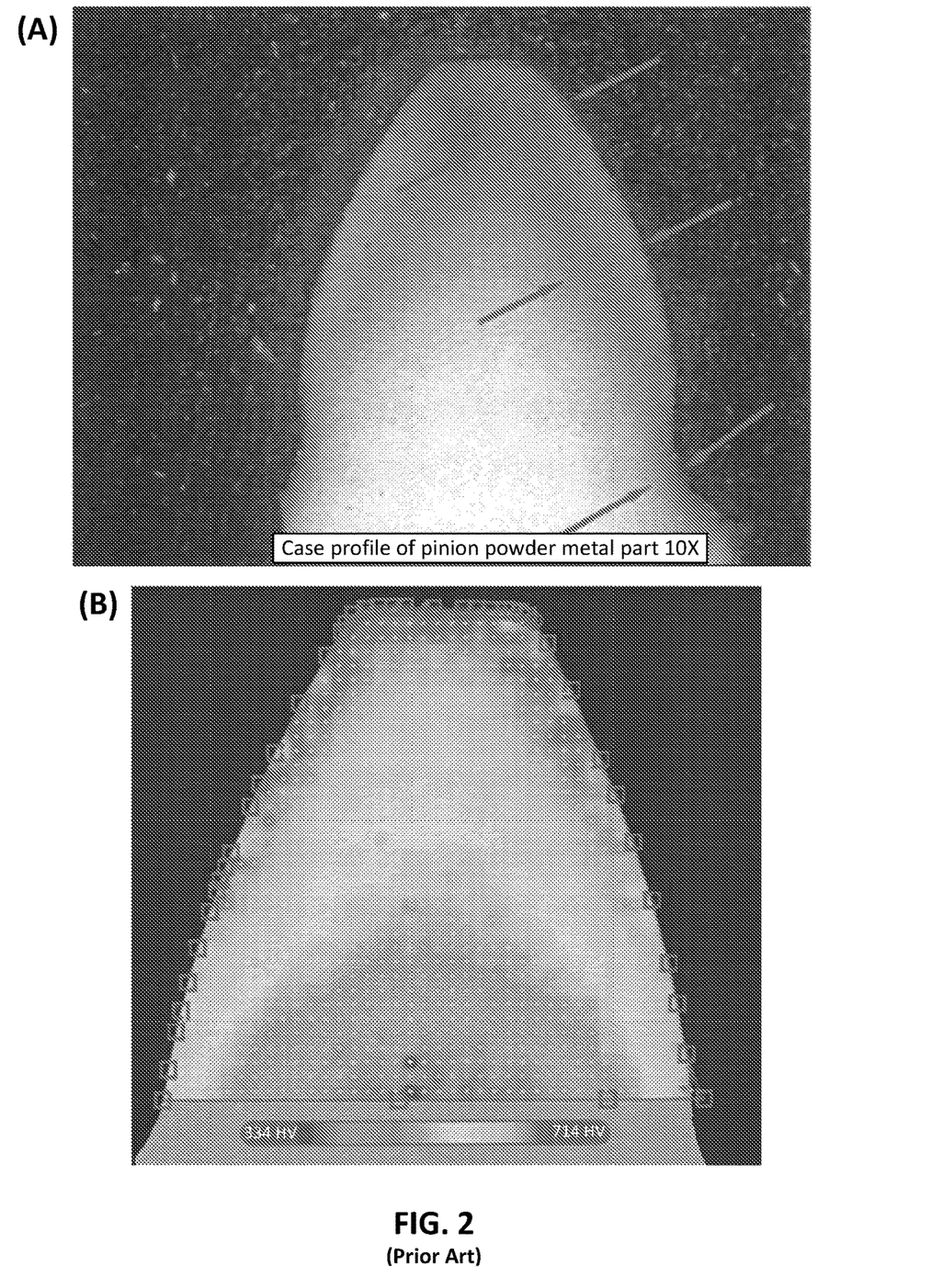
FIGS. 2A and 2B provide images of a case profile of a powder metal part produced using conventional sinter-carburizing methods alone in which all carburization occurs before the forging step.

With reference being made to FIGS. 2A and 2B, comparable carburization profiles to FIGS. 1A and 1B are illustrated for a gear tooth, but in which the gear tooth in FIGS. 2A and 2B is produced by sinter-carburizing rather than gas carburizing. It can be seen that, given the gaseous diffusion into the pores of the part, there is a much wider transition zone from the high to low carbon areas. Variations in density in the powder metal compact result can result in different depths of carbon diffusion in different regions and post-sinter-carburizing forging may also create variations in case thickness as well. Looking at the micrograph of FIG. 2A, it can be seen that the carbon diffusion depth is greatest at the tip and becomes shallower closer to the roots of the tooth. Looking at FIG. 2B which shows Vickers hardness numbers between 334HV and 714HV, it can be seen that there is a deeper carbon penetration into the tooth and a more gradual transition from the core to the surface layer than in the part from FIG. 1B.

However, even in the sinter-carburization process, there are certain conditions and products where the sinter-carburization process provides less than ideal results. For example, in parts having thin cross-sections or low spline/gear modules, these parts often cannot be effectively carburized without achieving a through (or fully) hardened condition due to the high diffusion rate of the carbon material during the sinter-carburization process. The end result may be a product that lacks ductility and toughness due to case depth embrittlement and which may not be metallurgically suitable based on the brittleness of these features. Additionally, products that do not meet the design requirements of the process can also have shallow case depths due to excessive material thinning during the forging operation, resulting in low strength and/or impact force resistance.

Disclosed herein is a method that incorporates aspects of both modes of carburizing (that is, sinter-carburizing of a less than full density powder metal part and gas-carburizing of a fully or nearly fully dense part) with an intermediate forging step. This method involves sequencing a first carburizing step while the part is still less than fully dense, a forging step to increase the density of the part, and a second carburizing step typically involving gas carburization of the near full or fully dense part.

At this stage, it is noted that the first carburizing step may be sinter-carburizing—and there is likely best economy in performing sintering and the first carburizing step together—however, it is also contemplated that there may be ways of separately performing the sintering step and the first carburization step. However, such de-coupling of the sintering and first carburization step may be need to be carefully and thoughtfully done because, once the pores of the part have been closed up, as often happens at the end of sintering, the mechanism by which the carbon-containing gas can migrate into the part is compromised and weakened.

It is also initially noted that, although the first step may involve sinter-carburizing a less than fully dense part, that this sinter-carburizing is different than the known modes of sinter-carburizing in that the sinter-carburizing is not performed to impart all carbon in the final carbon profile. Put differently, only a fraction of the final case profile is established during the sinter-carburizing step in this new method, whereas in conventional sinter-carburizing, the sinter-carburizing is the final and only step providing carbon for carburizing.

The disclosed methods, which may be referred to generally as variable diffusion carburizing (or VDCC) is an improvement over separate traditional gas carburizing and sinter-carburizing processes and addresses a number of their separate deficiencies. By incorporating aspects of both processes, it is possible to create a tailored, deep case depth of a variable nature, while at the same time reducing the cost input as compared to traditional gas carburization processes.

Again, at a high level, the method involves a pre-forging carburizing step of a less than fully dense part, a forging step to increase density of the partly-carburized part and to transform an pre-forging carburization profile into an as-forged carburization profile, and a post-forging carburization step in which carbon from the as-forged carburization profile further diffuses into the powder metal part and additional carbon is introduced at the surface of the powder metal part. Each of these steps will now be described in further detail.

As the first step, for example, the method may begin by performing a mild carburization step on a less than fully dense powder metal part or billet that is ferrous. This less than fully dense powder metal part may be a green compact compacted using conventional powder metallurgical compaction techniques in which the as-compacted part highly approximates the final geometry of the final part, but is slightly oversized to take into account shrinkage from the sintering of the part. It is contemplated that as a green compact, the powder metal part may have a density that is less than 90% of theoretical full density, for example.

This less than fully dense powder metal part is sintered to metallurgically bind the powder metal particles together, which can also involve burning off any wax, binder, or lubricant in the powder metal part. As noted above, as the particles of the powder metal bind and neck into one another, a porous network is created. During the sintering operation—which occurs at elevated temperature—the powder metal part can then readily accept carbon from the sintering atmosphere assuming that the carbon concentration in the sintering atmosphere is sufficiently high to thermodynamically drive the carbon into the ferrous powder metal compact.

The addition of carbon from the environment during sintering is a sinter-carburizing process that creates a controlled carbon content and depth as an initial carburization profile. This initial carburization profile, in view of the subsequent forging step will also be referred to as a pre-forging carburization profile. As noted in the section above describing the sinter-carburization process, due to the less than fully dense nature of the powder metal part, the diffusion rate is very high and therefore carbon can readily penetrate the part resulting in a deep carbon profile.

Figure 4:
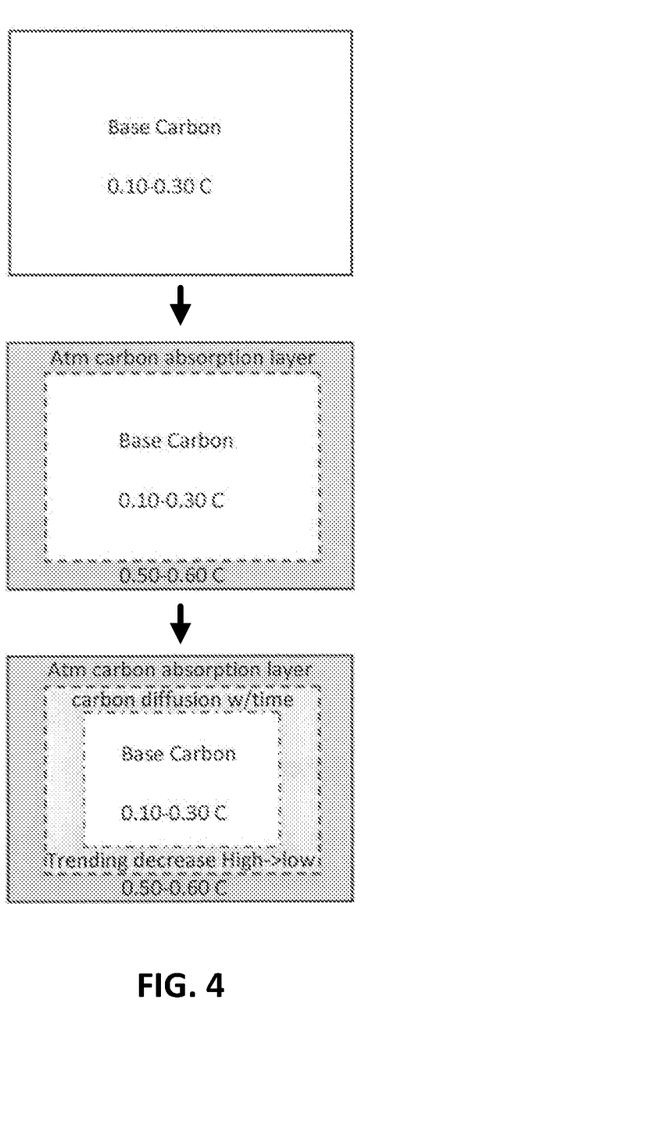
FIG. 4 provides a schematic illustrating stepwise sinter-carburizing of a powder metal part and the carbon amounts in each of the various regions.

One specific example of the first sinter-carburizing step is illustrated in FIG. 4. In FIG. 4, it is shown to start with a ferrous powder metal part in the uppermost or first block having 0.10 to 0.30 wt % carbon. Some amount of initial carbon in the powder metal component, albeit at a low level, is likely as the goal of this process is to produce a case carburized layer and 0.10 to 0.30 wt % carbon is typical of many applications; however, the particular amount of carbon is ultimately dependent on the material Jominy curve versus the desired hardness at various locations and type of quenching methods employed in the production of the final part. Upon sinter-carburizing, an enriched carbon layer of approximately 0.50 to 0.60 wt % carbon can develop as illustrated in the center and second block of FIG. 4. The bottom and third block indicates that, with additional carbon diffusion and time, the carbon profile can migrate to a significant extent and a generous gradient between the higher-carbon outer surface layer and the core (which remains at approximately 0.10 to 0.30 wt % carbon) is created. It should be appreciated that these numbers are exemplary only and should not be considered limiting.

Again, it will be appreciated that, in most forms of the method, the first carburization step will occur simultaneously or contemporaneously with a sintering step. In this way, the introduction to the carbon via the porous network of the less than fully dense part can most readily be facilitated. The combined sintering and carburizing has some economy as well as the heating of the part for sintering can also be used to promote diffusion of carbon. However, it is also contemplated that the first carburization step may occur separate from sintering—although it would be the case that such separate carburization would be most efficient with the particles partly bonded and the pores not closed up yet. Put differently, if the part is sintered and then carburized sequentially, the pores are likely to largely close up during sintering and carburization would be less effective unless the process is carefully controlled to prevent closure of the pores before carburizing.

Next, the powder metal part is forged to increase the density of the density under proper material flow conditions. In some forms, this can involve increasing the density to effective full density, which may be for example, MPIF effective full density. As pointed out elsewhere in this disclosure, effective full density is less than theoretical full density, but often approaches it. In some forms, this effective full density may be above 98% of theoretical full density and the density of the less than fully dense powder metal part before forging may be less than 95% of theoretical full density. This forging step can result in a mildly high carbon surface content for the powder metal part as a result of the forging process. Additionally, it is contemplated that the as-forged powder metal part may be left to cool in a non-quenched condition.

Many of the end-uses for parts manufactured by these methods demand the products have strengths that are obtained through forging in which the density and thus the strength of the part is greatly increased by forging.

Notably, the forging process not only increases the density of the powder metal part, but can also transform the pre-forging carburization profile into an as-forged carburization profile. This transformation may simply involve uniformly densifying that part and, in the process, only slightly altering the dimensions and the case profile (as would be the case if the pre-forged powder metal part has a pre-forging carburization profile that is of uniform depth and the forged powder metal part has an as-forged carburization profile that is also of uniform depth, even if the depths between the pre-forged and forged parts are slightly different as a result of forging and densification). However, in more complicated or complex methods, the forging process may also thicken and/or thin sections of the carburization profile due to variable material flow in the forging die. Again, how to employ such variable forging to modify or transform the carburized layer can be found in U.S. Pat. No. 8,517,884 entitled "Powder Forged Differential Gear" which issued on Aug. 27, 2013 to GKN Sinter Metals, LLC and which is incorporated by reference as if set for in its entity herein for all purposes. For the sake of immediate example, a carburization profile such as that shown in the center panel of FIG. 4 might be achieved by forging a preform having a relatively uniform case depth to thin the case depth in the root sections and thicken the case depth at the tip sections. This involves engineering the preform (that is, the pre-formed powder metal part) and the tool and die set to achieve the final outer surface geometry and variable case depth in the as-forged part.

It is also noted that because only a portion of the carbon is imparted in the first carburizing step (with the additional carbon being applied post-forging), the powder metal part may be more easily forged than a part in which all of the carbon is introduced prior to forging, as a heavy carburizing creates a hard, brittle case layer that challenging, if not impossible, to forge.

Still further, the forging step is described herein as increasing the density of the powder metal part; however, in most cases, this can involve forging the powder metal part to effective full density of the powder metal part (effectively a condition in which nearly all pores are closed or eliminated during forging). Nonetheless, it is contemplated that there may be some situations in which a less than effectively fully dense, but still densified, powder metal part might be have sufficiently closed porosity to proceed to the second carburizing step.

At this point and after forging and controlled cooling of the as-forged powder metal part, the as-forged powder metal part (now of increased density or of effective full density) can be carburized a second time in a post-forging carburizing step. At this point, with the powder metal part being at increased or effectively full density, the powder metal part can be gas carburized with much greater efficiency due to the carbon that was introduced in the first carburization step prior to forging. Thus, during this second carburizing step, both the pre-existing or "doped" or "charged" carbon from earlier in the process can continue to diffuse into the powder metal part and additional carbon can be absorbed into the surface of the powder metal part to create an extra-carbon rich outer region or case. Because of the preexisting carbon already being in place from the first carburization step, the second gas carburizing step is not as severely limited by time and temperature as pure gas carburizing of a fully dense part where the carbon is introduced in a single cycle/step and so a significant portion of the slow diffusion rate is avoided.

Figure 5:
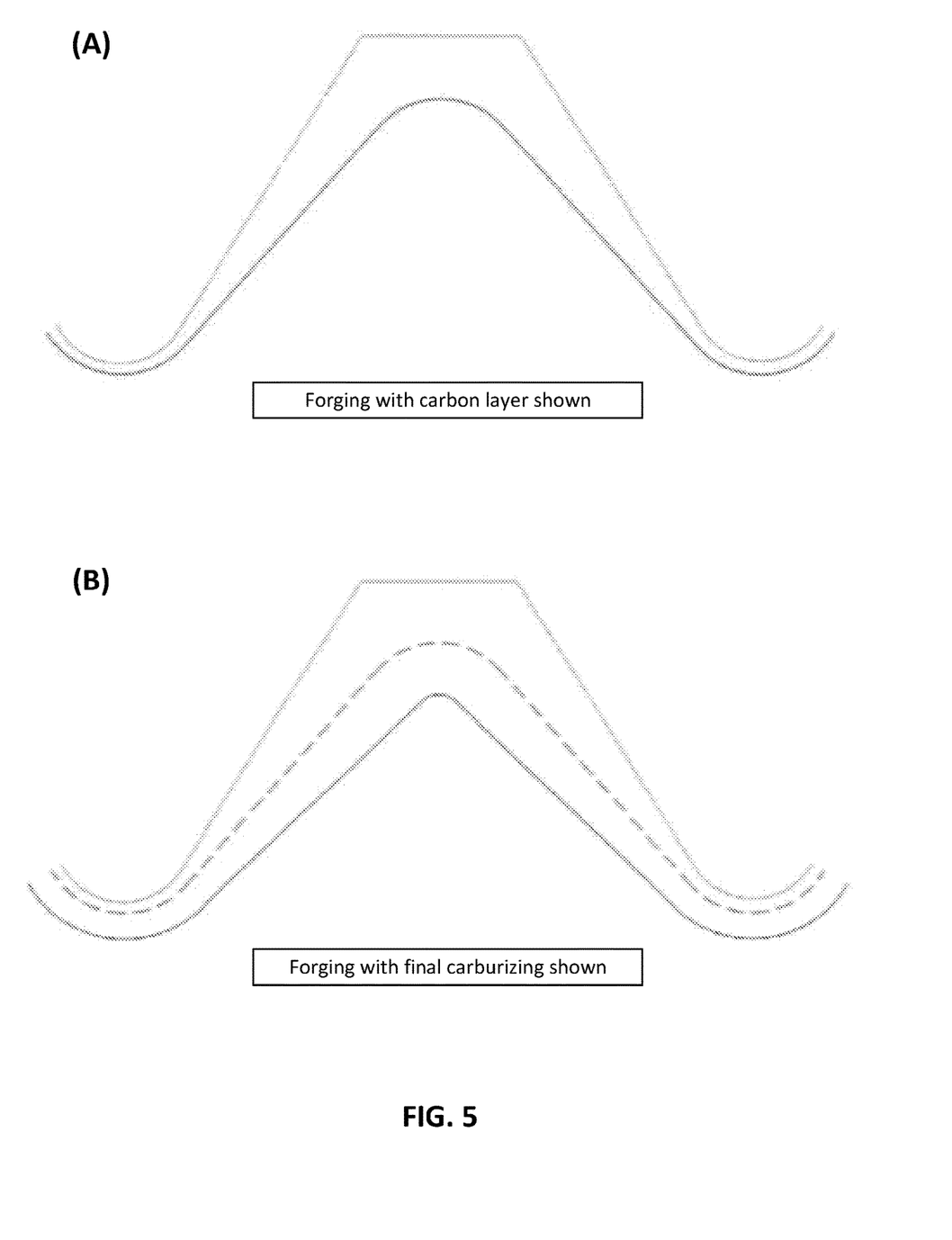
FIGS. 5A and 5B provides images depicting, in FIG. 5A, a gear form after pre-forge carburizing and forging and, in FIG. 5B, that same gear form after a further final carburization step.
Figure 6:
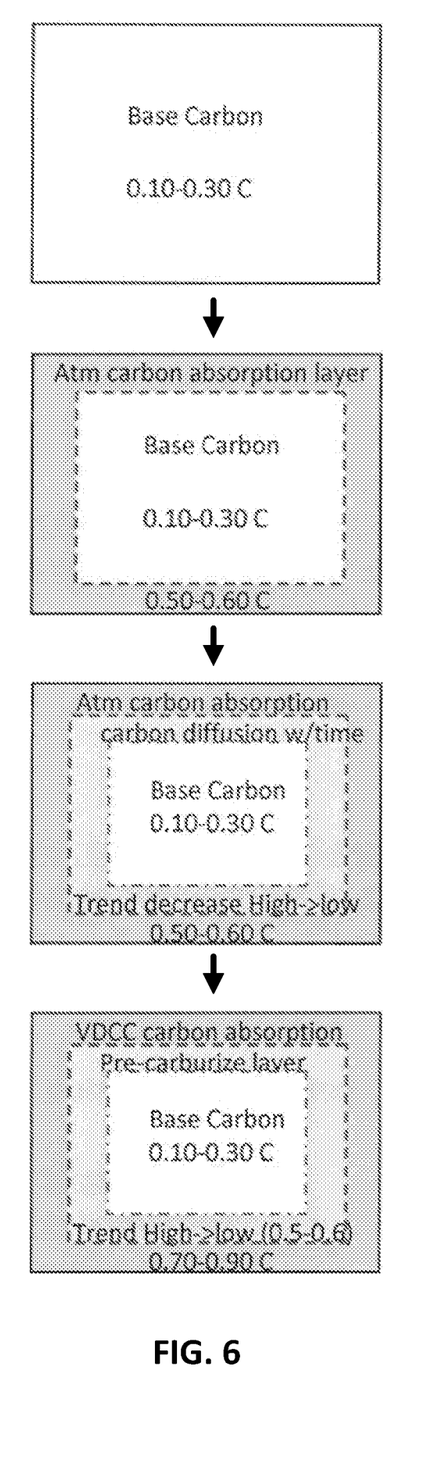
FIG. 6 provides a schematic similar to the schematic of FIG. 4, but further illustrating a final gas carburizing step after a forging step.

The benefit of this doping or charging of the carbon in the as-forged part is illustrated in FIGS. 5A, 5B and 6. In FIG. 5A, the profile of the outer surface of a part of a gear tooth is shown along with the carbon layer beneath it. Again, in this panel, the powder metal part has been forged and so the carbon layer imparted from the first carburizing step is of variable depth relative to the tooth surface with a thicker depth at the tips of the teeth and a thinner depth at the roots of the teeth. In FIG. 5B, upon further gas carburizing of this part in a second, post-forging carburization step, the original case profile (now shown dashed) has advanced roughly uniformly further into the body of the part. FIG. 6 illustrates this schematically as well. In FIG. 6, the first three panels illustrate a process similar to what was described above with respect to FIG. 4 and, then upon additional gas carburization in a second post-forging carburizing step, the profile of the rightmost panel develops in which the surface carbon content is able to increase to approximately 0.70 to 0.90 wt % carbon with a transition to another region of higher carbon of 0.5 to 0.6 wt % carbon before reaching the core.

Figure 3:
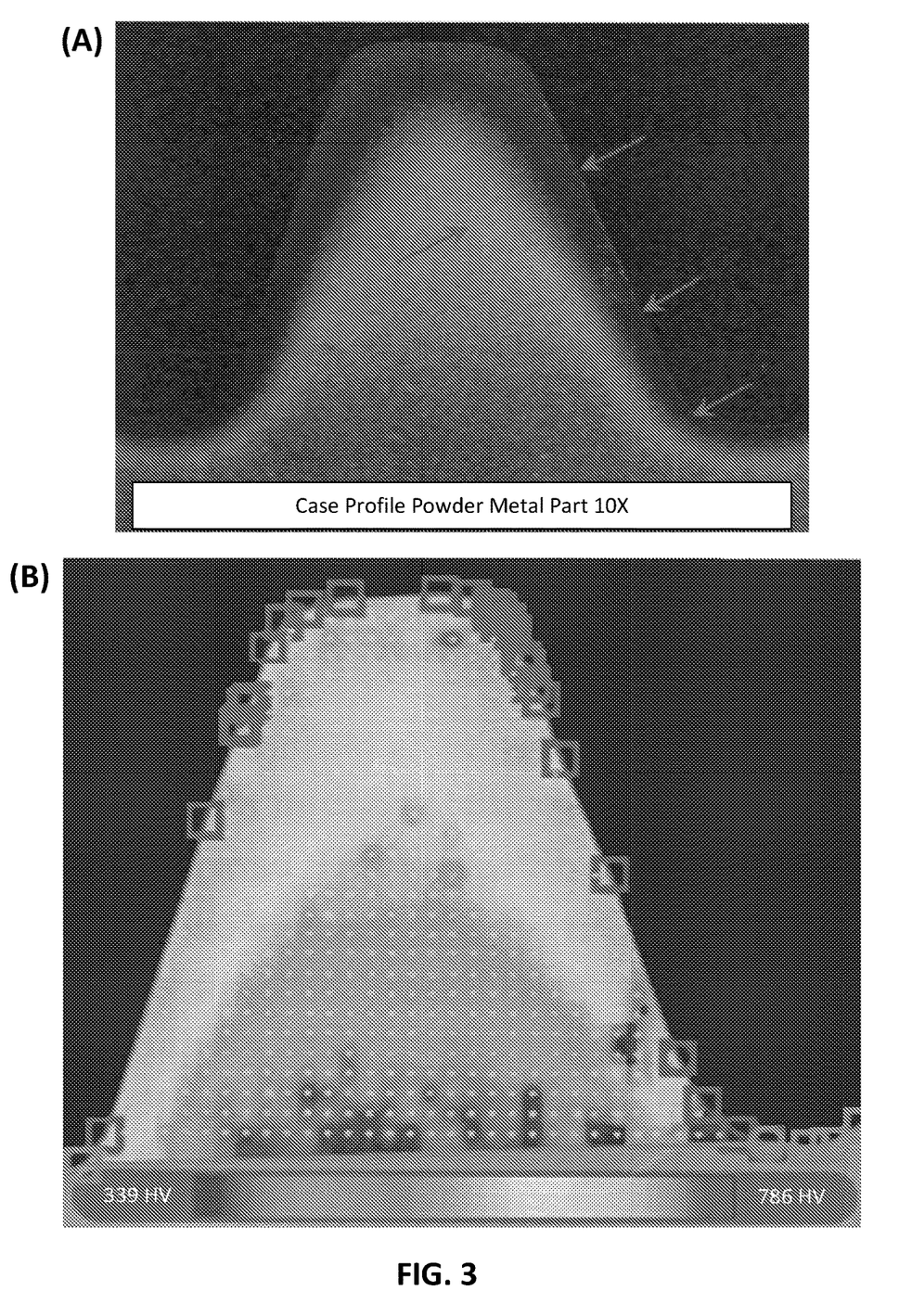
FIGS. 3A and 3B provide images of a case profile of a powder metal part produced using a multi-stage carburization process involving sequential sinter-carburizing, forging, and gas carburizing steps.

The resultant profile of the method involving two carburization steps separated by a forging step is also illustrated in FIGS. 3A and 3B, which provide a comparative image to the images from FIGS. 1A, 1B, 2A, and 2B above. In FIG. 3A, it can be seen that that a deep and variable case depth has been produced in which there is a sizeable carbon gradient in the transition zone between the hardened outer surface and the core especially in comparison to the parts illustrated as being produced by the forge and gas carburization process from FIGS. 1A and 1B and in comparison to the sinter-carburization and forge process from FIGS. 2A and 2B. Likewise, FIG. 3B illustrates the distributed hardness, which shows a generous gradient and smooth transition.

Apart from the improved structure and case profile, there are also many process benefits.

By using a forged part having the "doped" or pre-carburized condition, the as-forged powder metal part may have a surface carbon content that only is increased by less than half of the amount of carbon content versus a non-pre-carburized powder metal part. Thus, soak times at elevated carbon levels can be significantly decreased during post-forging carburization. Similarly for powder metal parts with high surface area—where the ability of the atmosphere or environment to provide carbon quickly enough to the surface of the part is a rate limiting factor—those parts may be processed more quickly because a portion of the carbon to be introduced into the part is already in the part from the pre-forging carburizing step.

Still further, using this method, much of the case depth is already present and within the near surface of the powder metal part, only involving a reduced amount of time and energy to further progress. This can result in a smoother case to core transition as illustrated in FIGS. 3A and 3B (which also illustrates how variable forging can be used to create a varying case depth). Ultimately, this smoothed transition from case to core reduces the internal shear stresses due to a progressive stress state that can be matched to a product's performance needs.

Additionally, the process can be tailored to lower modules, thinner design element-type products, where through or full hardening can be a concern in a sinter-carburizing/forging only process. In such processes, standard sinter-carburization to final forged form is not possible due to geometric conditions (that is, the sinter-carburized thin elements could not be forged without fracturing). However, this two-stage carburization process may provide the ability efficiently forge a part pre-charged with a smaller amount of carbon (which is still able to be forged without fracture) and then further carburizing this part after forging to obtain the additional carbon for the final desired hardness.

To appreciate the economic benefit of this new method, this new method—in which the carbon is doped or charged into the powder metal part before forging—is estimated to be capable of reducing the cost of subsequent gas carburization after forging by amounts of 40% in comparison to methods involving only gas carburization of a powder metal part without prior doping or charging of carbon. This exemplary 40% reduction in cost is based on increased throughput and reduced time requirements for meeting the same or deeper carbon penetration depths using post-forging gas carburizing alone as the mode for carburization. It is separately observed that the sinter-carburizing step for carburizing the powder metal part prior to forging does not involve much additional capital cost for implementation. In comparison to conventional sinter-carburizing, where all of the carbon is introduced in that single process, the first pre-forged carburizing step is not designed to impart all of the carbon in a single shot or does and therefore has a lower cost of implementation and generally higher throughput that conventional sinter-carburization processes.

Due to the separation of the carburizing steps—that is before and after the forging step—there is no option or benefit to direct quench and temper from the forging press. As such, the forged product is by definition a non-heat treated product that can be soft machined as final geometry dictates. On moderate to highly machined products, this can result in a reduced cost as well, as soft-turning is generally less expensive than hard-turning, while still realizing the additional reduction in cost of the gas carburizing operation.

While the methods described herein involve more processing steps than full sinter-carburizing alone, these new methods do not involve more steps than conventional gas carburizing processes, since those processes involve sintering, forging, and gas carburizing already. Thus, the methods described herein provide better economy while simultaneously providing opportunity for highly engineered case profiles that heretofore were not seen in single-step carburization methods.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A method of carburizing a powder metal part, the method comprising:
   carburizing, in a pre-forging carburizing step, a powder metal part that is less than fully dense to establish a pre-forging carburization profile, wherein a base carbon percentage of the powder metal part is 0.1 to 0.3 weight percent of the powder metal part prior to the pre-forging carburizing step and wherein a percent of carbon in a carburized region of the pre-forging carburization profile is 0.5 to 0.6 weight percent carbon after the pre-forging carburizing step;
   forging the powder metal part after the pre-forging carburizing step so that the powder metal part is increased in density and transforming the pre-forging carburization profile into an as-forged carburization profile; and
   carburizing, in a post-forging carburizing step, the powder metal part after the forging step thereby resulting in both further diffusion of carbon from the as-forged carburization profile into the powder metal part and further introduction of carbon into the powder metal part at a surface of the powder metal part.

2. The method of claim 1, wherein during the step of forging the powder metal part after the pre-forging carburizing step so that the powder metal part is increased in density, the powder metal part is forged to effective full density for the powder metal part.

3. The method of claim 2, wherein effective full density is above 98% of theoretical full density.

4. The method of claim 1, wherein a density of the powder metal part that is less than fully dense before the forging step is less than 95% of theoretical full density.

5. The method of claim 1, wherein the method further comprises sintering the powder metal part and wherein the pre-forging carburizing step occurs during the sintering of the powder metal part.

6. The method of claim 5, wherein a density of the powder metal part prior to sintering is less than 90% of theoretical full density of the powder metal component.

7. The method of claim 1, wherein, a base carbon percentage of the powder metal part is 0.1 to 0.3 weight percent of the powder metal part prior to the pre-forging carburizing step.

8. The method of claim 7, wherein a percent of carbon in a carburized region of the pre-forging carburization profile is 0.5 to 0.6 weight percent carbon after the pre-forging carburizing step.

9. The method of claim 8, wherein, after a post-forging carburizing step, a carbon percentage in a region closest to the surface of the powder metal part is 0.7 to 0.9 weight percent carbon.

10. The method of claim 1, wherein transforming the pre-forging carburization profile into an as-forged carburization profile involves starting from a pre-forging carburization profile having a uniform depth relative to the surface of the powder metal part and forging the powder metal part such that the as-forged carburization profile has a varying depth relative to the surface of the powder metal part.

11. The method of claim 1, wherein the powder metal part is ferrous.

12. The method of claim 1, wherein the pre-forging carburizing step results in carburization to a greater depth than a comparable powder metal part of similar composition that is fully dense because porosity of the powder metal part prior to the forging step provides non-diffusion based pathways for deeper penetration of carbon into a volume of the powder metal part.

13. The method of claim 1, wherein the powder metal part is a gear.

14. The method of claim 1, wherein after the post-forging carburization step, the powder metal part has a final carburization profile and wherein the final carburization profile has a carbon gradient from the surface of the powder metal part into the volume than is more gradual than a gradient from carburization of a full dense part that is carburized as a single step.

15. The method of claim 1, further comprising machining the powder metal part between the forging step and the post-forging carburizing step.

16. A sintered powder metal part made by the method of claim 1.

* * * * *